(12) United States Patent
Vikberg et al.

(10) Patent No.: US 9,119,202 B2
(45) Date of Patent: Aug. 25, 2015

(54) METHODS AND USER EQUIPMENTS FOR DEVICE TO DEVICE COMMUNICATION

(75) Inventors: Jari Vikberg, Järna (SE); Gabor Fodor, Hässelby (SE); Tomas Hedberg, Stockholm (SE); Gunnar Mildh, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 147 days.

(21) Appl. No.: 13/993,173

(22) PCT Filed: Dec. 13, 2010

(86) PCT No.: PCT/SE2010/051368
§ 371 (c)(1),
(2), (4) Date: Jun. 11, 2013

(87) PCT Pub. No.: WO2012/082024
PCT Pub. Date: Jun. 21, 2012

(65) Prior Publication Data
US 2013/0273907 A1    Oct. 17, 2013

(51) Int. Cl.
*H04W 76/04* (2009.01)
*H04W 48/02* (2009.01)
(Continued)

(52) U.S. Cl.
CPC ............ *H04W 76/043* (2013.01); *H04W 48/02* (2013.01); *H04W 48/08* (2013.01); *H04W 48/16* (2013.01); *H04W 92/18* (2013.01)

(58) Field of Classification Search
CPC ................................................ H04W 76/043
USPC ........ 455/426.1, 426.2, 450, 452.1, 437, 11.1
See application file for complete search history.

(56) References Cited

U.S. PATENT DOCUMENTS 8,548,483 B2 * 10/2013 Phan et al. ..................... 455/450
8,744,458 B2 *  6/2014 Hakola et al. ................. 455/450
(Continued)

FOREIGN PATENT DOCUMENTS

JP    2006333449 A    12/2006
WO   2010049801 A1    5/2010
(Continued)

OTHER PUBLICATIONS

Doppler, K. et al. "Device-to-Device Communication as an Underlay to LTE-Advanced Networks." IEEE Communications Magazine, Dec. 2009, pp. 42-49, Vo. 47, Issue 12.
(Continued)

*Primary Examiner* — Cong Tran
(74) *Attorney, Agent, or Firm* — Murphy, Bilak & Homiller, PLLC

(57) ABSTRACT

A method in a first user equipment for communicating with a second user equipment over a D2D radio link in a D2D radio network is provided. The first user equipment and the second user equipment are comprised in the D2D radio network. The first user equipment is further comprised in a cellular communications network. The first user equipment obtains (301) information of an upcoming occasion. The occasion is related to a communication in the cellular communications network. The first user equipment then sends (302) a message to the second user equipment over the D2D radio link. The message indicates the upcoming occasion and that communication from the second user equipment to the first user equipment over the D2D radio link shall be prohibited (303) during the occasion.

34 Claims, 6 Drawing Sheets

(51) Int. Cl.
*H04W 48/08* (2009.01)
*H04W 48/16* (2009.01)
*H04W 92/18* (2009.01)

(56) References Cited

U.S. PATENT DOCUMENTS

| | | | |
|---|---|---|---|
| 2010/0009675 A1* | 1/2010 | Wijting et al. | 455/426.1 |
| 2010/0014463 A1* | 1/2010 | Nagai et al. | 370/328 |
| 2011/0098043 A1* | 4/2011 | Yu et al. | 455/435.1 |
| 2012/0300662 A1* | 11/2012 | Wang et al. | 370/252 |
| 2013/0005377 A1* | 1/2013 | Wang et al. | 455/509 |
| 2013/0059583 A1* | 3/2013 | Van Phan et al. | 455/435.1 |
| 2013/0230032 A1* | 9/2013 | Lu et al. | 370/336 |

FOREIGN PATENT DOCUMENTS

| | | |
|---|---|---|
| WO | 2010082114 A1 | 7/2010 |
| WO | 2010139847 A1 | 12/2010 |

OTHER PUBLICATIONS

Doppler, K. et al. "Device-to-Device communications; functional prospects for LTE-Advanced networks." IEEE International Conference on Communications Workshops, Jun. 14-18, 2009, pp. 1-6, Dresden, Germany.

Zulhasnine, M. et al. "Efficient Resource Allocation for Device-to-Device Communication Underlaying LTE Network." 2010 IEEE 6th International Conference on Wireless and Mobile Computing, Networking and Communications, pp. 368-375.

Kim, Ronny Yongho et al. "WiMAX Femtocell: Requirements, Challenges, and Solutions." LG Electronics, Inc. IEEE Communications Magazine. pp. 84-91. Sep. 2009.

Knisely, Douglas N. et al. "Standardization of Femtocells in 3GPP." IEEE Communications Magazine. pp. 68-75. Sep. 2009.

Beming, Per et al. "LTE-SAE Architecture and Performance." Ericsson Review No. 3. 2007.

Unknown, Author. "3rd Generation Partnership Project; Technical Specification Group Radio Access Network; Evolved Universal Terrestrial Radio Access (E-UTRA); User Equipment (UE) procedures in idle mode (Release 9)." 3GPP TS 36.304 V9.3.0. Jun. 2010.

Unknown, Author. "3rd Generation Partnership Project; Technical Specification Group Services and System Aspects; Service requirements for Home NodeBs and Home eNodeBs (Release 9)." 3GPP TS 22.220 V9.0.0. Mar. 2009.

* cited by examiner

METHODS AND USER EQUIPMENTS FOR DEVICE TO DEVICE COMMUNICATION

TECHNICAL FIELD

Embodiments herein relate to a first user equipment, a method therein, a second user equipment and a method therein. In particular, it relates to a first user equipment communicating with a second user equipment over a D2D radio link in a D2D radio network.

BACKGROUND

Mobile stations are also known as e.g. mobile terminals, wireless terminals and/or user equipments (UE). Mobile stations are enabled to communicate wirelessly in a cellular communications network or wireless communication system, sometimes also referred to as a cellular radio system. The communication may be performed e.g. between two mobile stations, between a mobile station and a regular telephone and/or between a mobile station and a server via a Radio Access Network (RAN) and possibly one or more core networks, comprised within the cellular communications network.

Mobile stations may further be referred to as mobile telephones, cellular telephones, or laptops with wireless capability, just to mention some further examples. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the mobile stations within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for mobile stations. The 3GPP has undertaken to evolve further the UTRAN and GSM based radio access network technologies.

According to 3GPP/GERAN, a mobile station has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, the expression DownLink (DL) is used for the transmission path from the base station to the mobile station. The expression UpLink (UL) is used for the transmission path in the opposite direction i.e. from the mobile station to the base station.

More and more communication is related to communication in a mixed cellular and Device-to-Device (D2D) communications environment.

Cell Search and Cell Selection in LTE

Before a user equipment can transmit or receive information to/from an 3GPP LTE network, it must search and select an appropriate serving cell, derive basic system information and perform random access. These steps together are often referred to as "initial access" and enable a user equipment to obtain synchronization, fundamental system parameters and to get access to system resources.

The first step, i.e. cell search and selection, is necessary for the user equipment to synchronize both in time and frequency to the so called Primary Synchronization Signals (PSS) and Secondary Synchronization Signals (SSS) that together encode the different LTE cells' Physical (PHY) layer cell identity, the so called PHY Cell ID or "PCI" or "RD" for short, composed by the physical layer cell identity group (0 . . . 167) and the physical layer identity (0, 1 or 2). The PSS and SSS signals are constructed in a special way that makes it possible for an LTE user equipment after power up, i.e. increasing its power, to find and lock onto these signals and decode the PCI.

Once the user equipment has successfully performed cell search and cell selection, it is able to decode the PHY Broadcast CHannel (PBCH) and read out the so called Master Information Block (MIB). The MIB comprises essential system information, such as the system bandwidth and the number of transmit antennas at the base station side that the user equipment needs to know for being able to communicate with the LTE network.

Once the user equipment has decoded the MIB it has enough information to decode the System Information Blocks (SIBs) transmitted on the DL Shared CHannel (DL-SCH). There are multiple SIBs ranging from 1 and upwards. Out of these SIBs, SIB1 and SIB2 are essential for accessing the network and begin UL transmission. SIB1 and 2 comprises information about the configuration of the different radio channels in the cell, e.g. PHY UL Control CHannel (PUCCH), Paging Control Channel (PCCH) and Random Access CHannel (RACH), as well as cell barring information indicating which user equipments are allowed to access the cell and whether a user equipment should refrain from camping on a cell even if it provides coverage at the location of the user equipment.

Finally, the Random Access (RA) procedure is used to obtain, as well as to re-establish, uplink synchronization and an initial grant to uplink transmission resources. During RA, the LTE eNB sends a RA Response to the user equipment that comprises for example time alignment instruction, as well as initial PHY Uplink Shared CHannel (PUSCH) resource grant that together allow the user equipment to transmit uplink data and/or signaling. Once the user equipment has performed the RA procedure the user equipment and eNB are able to communicate with each other controlled by dedicated signaling over the DL-SCH.

Device-to-Device (D2D) Communications in LTE

Device-to-device (D2D) communication has been promoted as a means to provide peer-to-peer services between user equipments, facilitate infrastructure-less communications in emergency, and National Security and Public Safety (NSPS) situations and to enhance network capacity by off-loading traffic from the radio access network.

A design option for implementing D2D communications between LTE user equipments is to adopt a Bluetooth master-slave concept such that one of the communicating user equipments takes the master role and closely emulates an LTE micro eNB. In such a design the Master user equipment provides the synchronization signals PSS and SSS, as well as the essential system information, e.g. MIB and some of the SIBs such as SIB1 and 2. It also implements the standard RA procedure allowing for a similar initial access for the Slave user equipment as a regular cellular eNB.

Although the eNB emulation makes the Master user equipment appear as a "real" eNB, there are also some significant differences that are not transparent to the Slave user equipment. For example, the services provided by a Master user equipment are largely different since the Master user equipment may not even be connected to a mobile core network.

Home Base Stations and Femtocells in LTE

The increasing demand for indoor service coverage has triggered the standardization of so called femto cells and home base stations both by the 3GPP such as Home Node B (HNB) for UMTS and Home eNodeB (HeNB) for LTE, and by the Institute of Electrical and Electronics Engineers (IEEE) communities. A femtocell is served by a small cellular base station, typically designed for use in a home or small business. Although a HeNB provides similar basic functionalities towards an LTE user equipment, a HeNB differs from a macro eNB in terms of output transmit power, mobility support, access control such as Closed Subscriber Groups (CSG) handling, operation and maintenance procedures and possibly also in terms of the provided services. Note that handover to/from a macro eNB may not be transparent.

Location Registration and Paging in LTE

A new principle has been introduced for location registration in System Architecture Evolution (SAE)/LTE networks. This principle is based on a Tracking Area (TA) concept in a similar way as Location Areas (LA) and Routing Areas (RA) in GSM and WCDMA networks. Each SAE/LTE cell belongs normally to a single TA, if not considering RAN sharing deployments, and the Tracking Area Identity (TAI) is broadcasted as part of System Information (SI). The TAI comprises a Mobile Country Code (MCC), a Mobile Network Code (MNC) and a Tracking Area Code (TAC).

The main difference from the LA/RA concepts is that in SAE/LTE a concept called multiple TAs and associated TAI List has been introduced. This means that the network may return a TAI List to the user equipment as part of some EPS Mobility Management (EMM) procedures like Attach, Tracking Area Update (TAU) and Globally Unique Temporary Identity (GUTI) Reallocation. As long as the user equipment camps on a cell belonging to a TA who's TAI is included in the current TAI List, the user equipment does not perform normal TAUs (periodic TAUs are still performed). The user equipment performs normal TAU first when it moves to a cell that does not belong to a TA in the TAI List. As part of this TAU, the user equipment receives a new TAI List and the same procedure continues.

As the network knows the user equipment location on the TAI List level, this means that the Paging Area is also normally all the TAs included in the TAI List. The Paging procedure is used to inform a user equipment in Radio Resource Control (RRC)-IDLE state about an "incoming call" and the need for the user equipment to move to the RRC-CONNECTED state. When the user equipment is in a RRC-IDLE state it is in a state where no connection to a base station is established yet. When the user equipment is in a RRC-CONNECTED state it is in a state wherein a connection to a base station is established. Paging may also be used for other purposes like to inform the user equipment about System Information change or about ETWS (Earthquake and Tsunami Warning System) related notifications.

The Paging Channel (PCH) provides also support for user equipment discontinuous reception (DRX) to enable user equipment power saving. This is achieved by the user equipment in idle mode monitoring the PDCCH channel for a P-RNTI (Paging Radio Network Temporary Identifier) value indicating paging. The user equipment only needs to monitor the PDCCH channel at certain user equipment-specific occurrences i.e. specific subframes within specific radio frames, see below. At other times, the user equipment may apply DRX by for example switching off the receiver to preserve battery power.

In a mixed radio environment, an LTE user equipment may need to be able to communicate via the different types of access points and with different other user equipments. One example is the case when a user equipment is active in a D2D communication with one or more other user equipments and when any of these user equipments would like to be able to receive paging in the "macro coverage" i.e. from an LTE eNodeB simultaneously with the D2D communication.

Today methods require that the devices engaged in a D2D session have the same paging occasions. Typically, user equipments being served in a cell may have paging occasions at separate time instances which may be determined prior to the devices starting a D2D session. Thus, in today's methods, the user equipment that is engaged in simultaneous D2D and cellular communication may miss cellular paging. This applies mainly for single-receiver user equipments, i.e. cases when the same physical radio equipment is used for both macro and local communications, or in scenarios where dual receiver is not feasible, e.g. the carriers used in the macro and local communication are too close.

SUMMARY

It is therefore an object of embodiments herein to provide a way of improving mixed cellular and D2D communication performance.

According to a first aspect of embodiments herein, the object is achieved by a method in a first user equipment for communicating with a second user equipment over a D2D radio link in a D2D radio network. The first user equipment and the second user equipment are comprised in the D2D radio network. The first user equipment is further comprised in a cellular communications network. The first user equipment obtains information of an upcoming occasion. The occasion is related to a communication in the cellular communications network 102. The first user equipment then sends a message to the second user equipment over the D2D radio link. The message indicates the upcoming occasion and that communication from the second user equipment to the first user equipment over the D2D radio link shall be prohibited during the occasion.

According to a second aspect of embodiments herein, the object is achieved by a method in a second user equipment for communicating with a first user equipment over a D2D radio link in a D2D radio network. The first user equipment and the second user equipment are comprised in the D2D radio network. The first user equipment further is comprised in a cellular communications network. The second user equipment receives a message from the first user equipment over the D2D radio link. The message indicates an upcoming occasion of the first user equipment and that communication from the second user equipment to the first user equipment over the D2D radio link shall be prohibited during the occasion, which occasion is related to communication in the cellular communications network.

According to a third aspect of embodiments herein, the object is achieved by a first user equipment for communicating with a second user equipment over a D2D radio link in a D2D radio network. The first user equipment and the second user equipment are configured to be comprised in the D2D radio network. The first user equipment is further configured to be comprised in a cellular communications network. The first user equipment comprises an obtaining unit configured to obtain information of an upcoming occasion. The occasion is related to a communication in the cellular communications network. The first user equipment further comprises a transceiver configured to send a message to the second user equipment over the D2D radio link. The message indicates the upcoming occasion and that communication from the second user equipment to the first user equipment over the D2D radio link shall be prohibited during the occasion.

According to a fourth aspect of embodiments herein, the object is achieved by a second user equipment for communicating with a first user equipment over a D2D radio link in a D2D radio network. The first user equipment and second user equipment are comprised in the D2D radio network. The first user equipment further is comprised in a cellular communications network. The second user equipment comprises a transceiver configured to receive a message from the first user equipment over the D2D radio link. The message indicates an upcoming occasion of the first user equipment and that communication from the second user equipment to the first user equipment over the D2D radio link shall be prohibited during the occasion. The occasion is related to communication in the cellular communications network.

Since the second user equipment is informed of the occasion of the first user equipment in the cellular communications network, it can prohibit communication from the second user equipment to the first user equipment over the D2D radio link during the occasion. This means that the D2D communication will not disturb the communication in the cellular communications network, which in turn results in an improved mixed cellular and D2D communication performance.

A further advantage with embodiments herein is that they allow D2D communication to integrate smoothly into an LTE network.

A further advantage with embodiments herein is that they provide ways that are transparent to the cellular network to enable user equipments to e.g. receive paging as the user equipments even when they are in active communication in a D2D part of a communications environment while the respective paging occasions are occurring in the cellular communications network.

BRIEF DESCRIPTION OF THE DRAWINGS

Examples of embodiments herein are described in more detail with reference to attached drawings in which.

DETAILED DESCRIPTION

Embodiments will be exemplified in the following non-limiting description.

A concept of embodiments herein is to provide the possibility for a user equipment to indicate in D2D communications user equipment specific occasions in the cellular network when it is not able to take part in the D2D communications.

Figure 1:
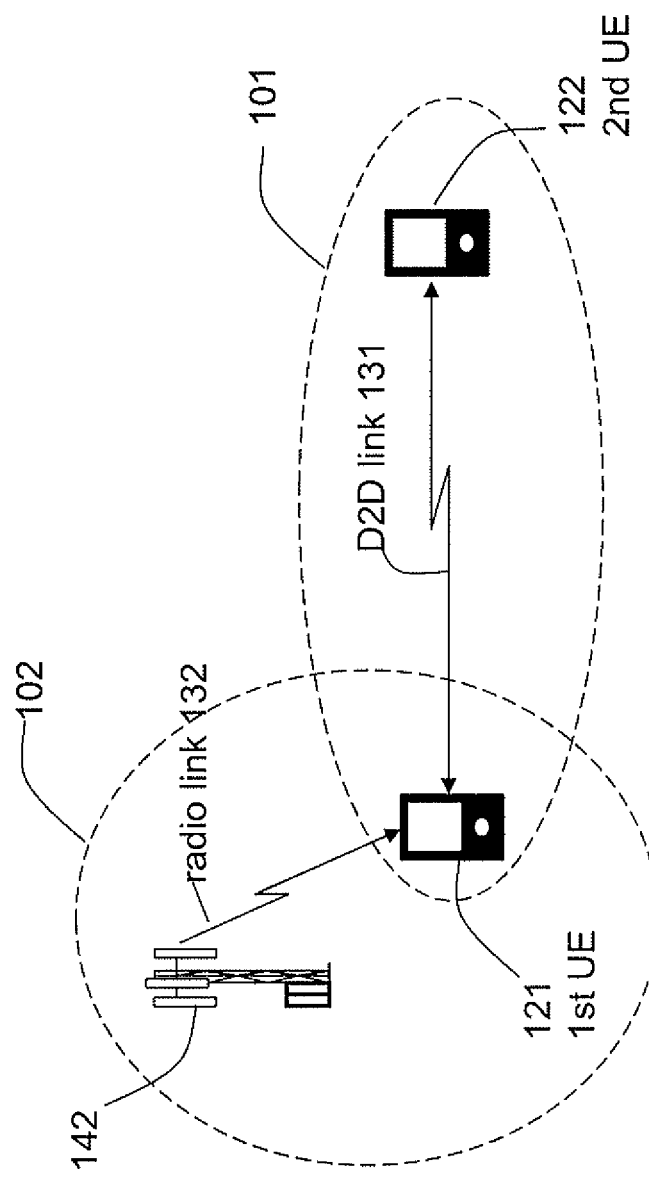
FIG. 1 is a schematic block diagram illustrating embodiments in a mixed communications environment.

FIG. 1 depicts a mixed communications environment in which embodiments herein may be implemented. The mixed communications environment comprises a D2D radio network 101 and a cellular communications network 102, i.e. a mix of the D2D radio network 101 and the cellular communications network 102.

Cellular Communications Network 102

The first user equipment 121 is comprised in the cellular communications network 102. The cellular communications network 102 is a cellular communication network such as an LTE, WCDMA, GSM network, or any other cellular communications network. These networks may comprise base stations of different classes such as macro base stations, home base stations or pico base stations. The first user equipment 121 is configured to communicate within the cellular communications network 102 via a base station 142 over a radio link 132 when the first user equipment 121 is present in a cell served by the base station 142. The base station 142 may e.g. be a radio base station such as an eNB, eNodeB which may also be referred to as macro base stations, or a Home Node B, a Home eNode B or any other network unit capable to serve a user equipment in a cellular communications system.

D2D Radio Network 101

The D2D radio network 101 is a communication network wherein two or more user equipments or other devices, in this example in FIG. 1 a first user equipment 121 and a second user equipment 122, communicates directly with each other and not via a cellular communications network. One such example is a network using a master and slave concept such as e.g. a Bluetooth system. Bluetooth is an open wireless technology standard for exchanging data over short distances, using short wavelength radio transmissions from fixed and mobile devices. Another example is a D2D radio network based on LTE. The D2D radio network 101 may be used to provide peer-to-peer services between user equipments, facilitate infrastructure-less communications in emergency, and NSPS related situations and to enhance network capacity by offloading traffic from a cellular communications system. One example of a D2D radio network is an ad-hoc network where one user equipment may set up a direct connection with another user equipment via a handshake and competition procedure. The first user equipment 121 is arranged to communicate with the second user equipment 122 over a D2D radio link 131 within the D2D radio network. In embodiments wherein the D2D radio network 101 uses a master and slave concept, one of the communicating user equipments takes the master role and closely emulates a base station such as LTE eNB. In these embodiments the second user equipment 122 may be a master device and the first user equipment 121 may be a slave device, it may however be the other way around.

First User Equipment 121

Accordingly, the first user equipment 121 is capable of both communications which may be referred to as "macro" communications in the cellular communications network 102, and D2D communications, also referred to as local communications within the D2D radio network 101. The first user equipment 121 may be a terminal, e.g. a mobile terminal or a wireless terminal, a mobile phone, a computer such as e.g. a laptop, Personal Digital Assistant (PDA), or any other radio network unit capable to communicate over a D2D link and over a radio link in a cellular communications system. As mentioned above, in some embodiments the first user equipment 121 may be a slave device.

Second User Equipment 122

The second user equipment 122 may be a terminal, e.g. a mobile terminal or a wireless terminal, a mobile phone, a computer such as e.g. a laptop, Personal Digital Assistant (PDA), or any other radio network unit capable to communicate over a D2D link. The second user equipment 121 may further be connected to a cellular communication system not shown similar to the cellular communications network 102. The second user equipment 122 is capable of at least D2D communications, also referred to as "local" communications within the D2D radio network 101, but may also be capable of both "macro" communications and D2D communications.

As mentioned above, in some embodiments the second user equipment 121 may be a master device.

Figure 2:
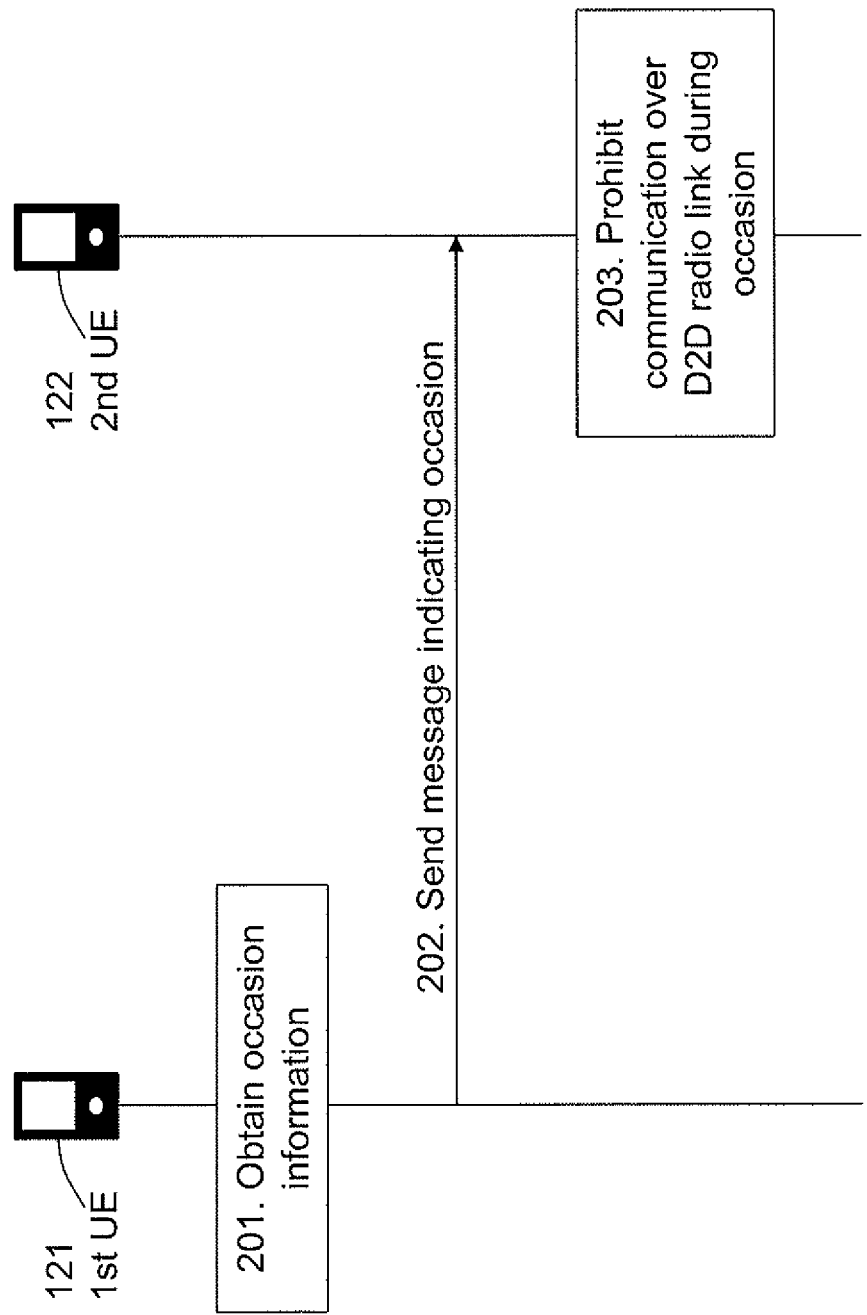
FIG. 2 is a combined flowchart and signalling diagram depicting embodiments of a method.

Embodiments of a method will now be described with reference to the flowchart depicted in FIG. 2, with reference to an example relating to a paging occasion in the cellular communications network 102. In this scenario the first user equipment 121 is active in a D2D communication with the second user equipment 122. Further in this example, the first user equipment 121 is in a Radio Resource Control (RRC)-IDLE state in the cellular communications network 102 i.e. in a mode where no connection to the base station 142 is established yet. As mentioned above the paging procedure is used to inform the first user equipment 121 in RRC-IDLE state about an "incoming call" and the need for the first user equipment 121 to establish a connection to the cellular communications network 102 and to move to the RRC-CONNECTED state, i.e. a mode when first user equipment 121 is connected to the base station 142. The method comprises the following actions:

Action 201

The first user equipment 121 obtains information of an upcoming occasion. The occasion is related to a communication in the cellular communications network 102. In the specific example the first user equipment 121 may obtain the information by being aware of its own Paging Occasions. The information regarding the paging occasions may be obtained by the first user equipment 121 by knowing its own IMSI and other information based on either broadcasted system information within the cellular communications network or user equipment specific DRX, e.g. if configured by upper layers as described above. Upper layers mean for example communication between the user equipment and the core network or between an application program in the user equipment and an application server.

Action 202

The first user equipment 121 then sends a message to the second user equipment 122 over the D2D radio link 131. The message indicates the upcoming occasion and that communication from the second user equipment 122 to the first user equipment 121 over the D2D radio link 131 shall be prohibited during the occasion. According to the specific example, the first user equipment 121 indicates its own paging occasion to the second user equipment 122. In some embodiments this may e.g. be performed by the first user equipment 121 providing information about the subframes used for Paging Occasions, i.e. specific subframes within specific radio frames used in communication in the cellular communications network 102. In some embodiments this may e.g. be performed by the first user equipment 121 providing information that would be needed by second user equipment 122 to calculate the paging occasion for the first user equipment 121 so that communication from the second user equipment 122 to the first user equipment 121 over the D2D radio link 131 shall be prohibited during the occasion.

Action 203

The second user equipment 122 prohibits the communication from the second user equipment 122 to the first user equipment 121 over the D2D radio link 131 during the occasion, according to the received message. In this way the second user equipment 122 ensures that it will not engage the first user equipment 121 in any communication during the first user equipment's paging occasion which ensures that the user equipment may listen for paging occasions in the D2D radio network 101.

Figure 3:
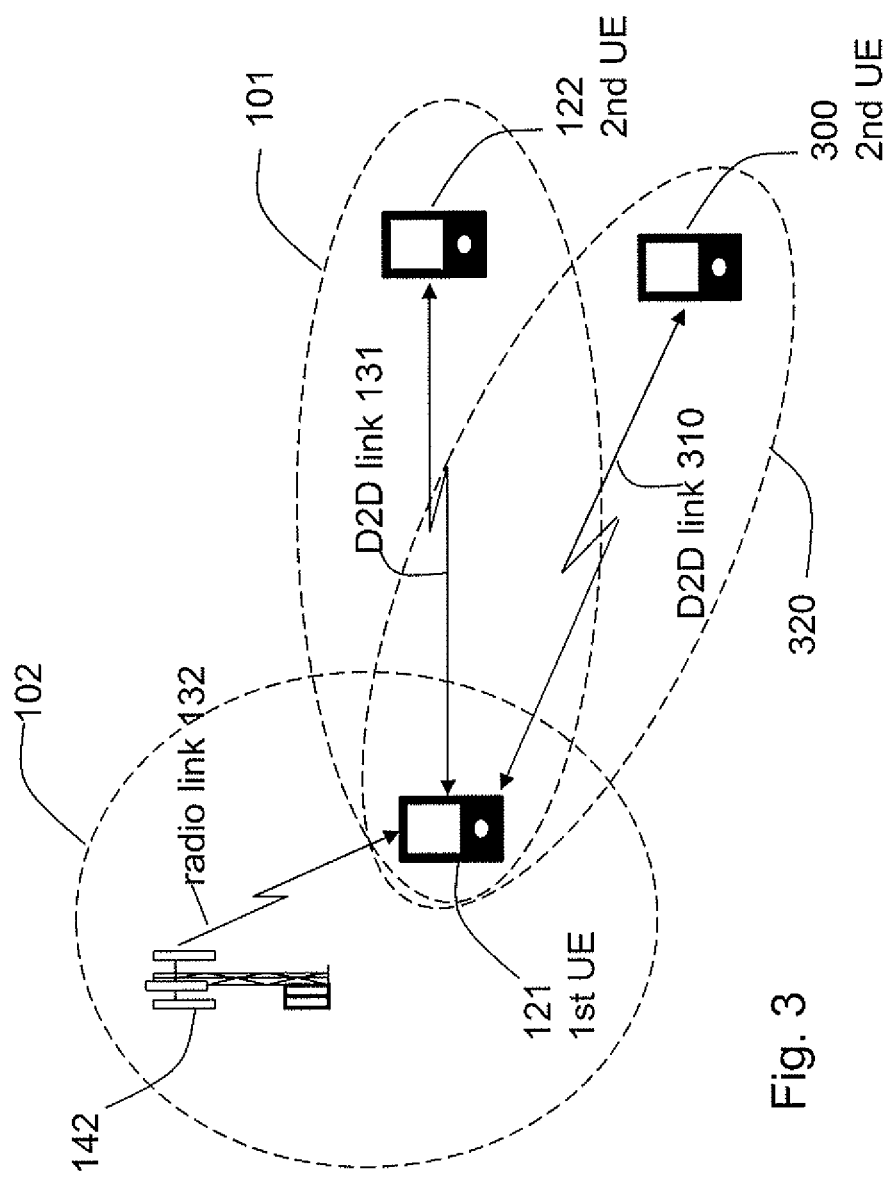
FIG. 3 is a schematic block diagram illustrating embodiments in a mixed communications environment.

The general method may also be used by multiple user equipments in the same time and in both directions in the D2D communications. In one embodiment the first user equipment 121 is further connected to another second user equipment 300 over a another D2D link 310 in another D2D radio network 320 as depicted in FIG. 3. In these embodiments, the message sent to the second user equipment 122 over the D2D radio link 131 in Action 202 is further sent to the other second user equipment 300 over the other D2D radio link 310. In these embodiments, in the Action 203 also the other second user equipment 300 prohibits the communication from the other second user equipment 122 to the first user equipment 121 over the other D2D radio link 310 during the occasion, according to the message received from the first user equipment 121.

It may also be extended to the case when there would be more than 2 user equipments in a "D2D piconet." For example, a piconet may comprise both the first user equipment 121 and the second user equipments 122 and 300.

Figure 4:
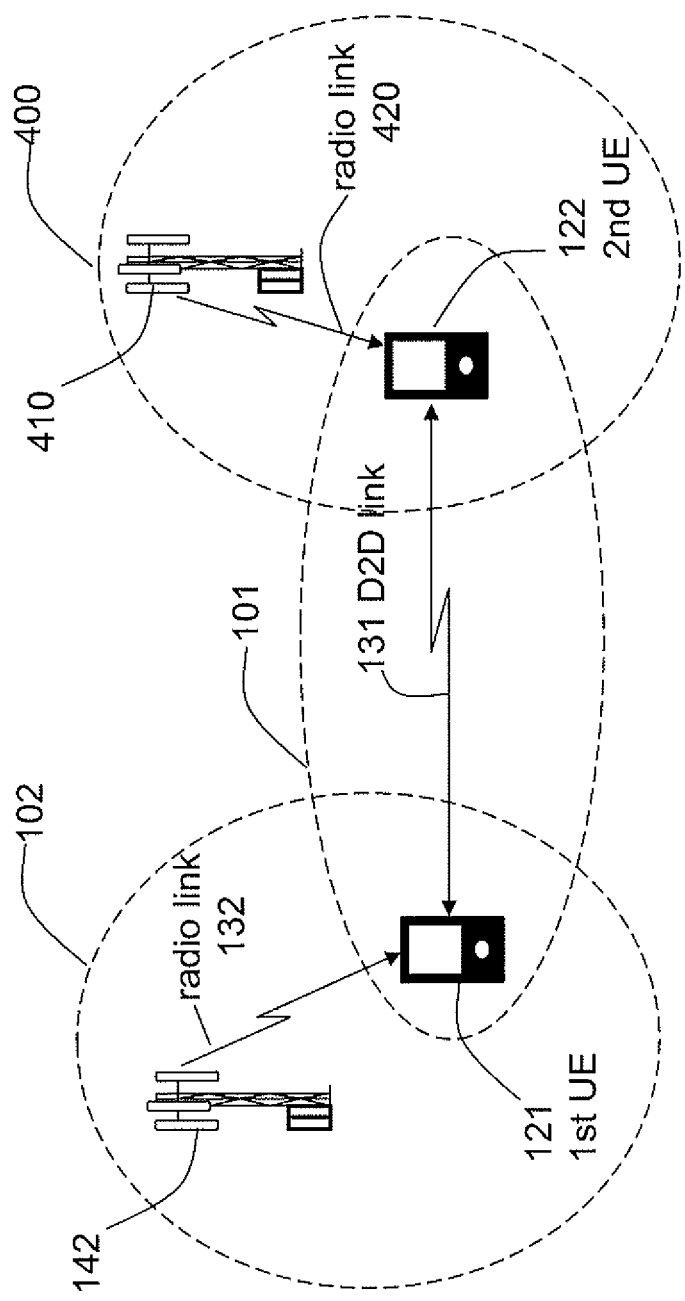
FIG. 4 is a schematic block diagram illustrating embodiments in a mixed communications environment.

In another embodiment the method is performed in both directions as depicted in FIG. 4. In this embodiment the second user equipment 122 is comprised in second cellular communications network 400 and is capable of being connected to a second base station 410 within the cellular communications system 400 over a second radio link 420. In these embodiments, Action 201 further comprises that the second user equipment 122 obtains information of an upcoming occasion referring to communication within the second cellular communications network 400. In this embodiment, action 202 further comprises that the second user equipment 122 sends a message to first user equipment 121 over the D2D radio link 131. This message indicates the upcoming occasion in the second user equipment and that communication from the first user equipment 121 to the second user equipment 122 over the D2D radio link 131 shall be prohibited during the occasion of the second user equipment 122. In this embodiment Action 203 further comprises that the first user equipment 121 prohibits the communication from the first user equipment 121 to the second user equipment 122 over the D2D radio link 131 during the occasion of the second user equipment 122, according to the received message. This embodiment may as well be combined with the embodiments described above such as the embodiment described with reference to FIG. 3. In a specific embodiment, the second cellular communications network 400 is the same as the cellular communications network 102, i.e. the second user equipment 122 is comprised in the same cellular communications network as the first user equipment 121.

As mentioned above, the method applies well in embodiments comprising the master-slave architecture based local communications of the D2D radio network 101, 320. in these embodiments it is not necessary that all the slaves and/or the master have macro network capabilities, i.e. cellular communications network capabilities. The master user equipment, e.g. the second user equipment 122 may orchestrate the local communications, i.e. control the D2D communications based on its own capabilities and the information received from the slave user equipments such as the first user equipment 121. In a similar way, the first user equipment 121 may be the master and may orchestrate the local communications, i.e. control the D2D communications based on its own capabilities and the information it has about the occasions related to cellular communications network 102. In addition, the first user equipment 121 may also receive such information from the slave user equipments such as the second user equipment 122.

Embodiments herein applies also for the cases when only the master user equipment has first radio communication system capabilities, i.e. in the case where the first user equipment 121 is the master but not the second user equipment 122.

Embodiments herein further apply for the cases when the master user equipment and only a subset of the slave user equipments have cellular communications network capabilities. In this case all the user equipments with cellular communications network capabilities are first user equipments 121 and the user equipment acting as master is the second user equipment 122, 300.

Embodiments herein further applies for the cases when only the slave user equipments, or a subset of these, have cellular communications network capabilities. Also in this case all the user equipments with cellular communications network capabilities are first user equipments 121 and the user equipment acting as master is the second user equipment 122, 300.

In addition, the first user equipment 121 or second user equipment 122 may dynamically change any previously communicated "Paging Occasion" by sending the information again. This may be for example due to change of camping cell or that the network would provide any updated information either on broadcast or as unicast, the latter being user equipment specific.

The example above is given related to communication of paging occasions of the first user equipment 121 in the cellular network 102, to the D2D radio network user equipment or user equipments, i.e. the second user equipment 122, and possibly the other second user equipment 300. Further, the second user equipment 122 and possibly the other second user equipment 300 in the D2D radio network, may take into account the information to achieve smooth simultaneous co-existence between the D2D radio network 101 and possibly the other D2D radio network 320, and the cellular communications network 102, and possibly the second cellular communications network 400.

However, embodiments of the method may be used for other functions than just paging occasions.

In some embodiments the first user equipment 121 indicates a need for a gap of time or gaps in the D2D communication over the D2D radio link 131 for any other reason than just paging. One example is when the first user equipment 121 camping on the cellular communications network 121 requires performing continuous measurements of neighboring cells to ensure that it is camping on the best possible cell. Other examples comprises when the first user equipment 121 requires a gap or gaps in the D2D communication over the D2D radio link 131 to acquire system information broadcasted in the cell, to receive actual data transmission, or to receive emergency broadcast info, or MBMS services etc. Gaps may also be required for UL transmissions from the first user equipment 121 to the base station 142 in the cellular communications system 102.

Even though some examples above indicate that the first user equipment 121 communicates its exact occasion in the cellular communications network 102, the gap created may very well be somewhat larger than just the occasion. This may be achieved by the first user equipment 121 adding the time required to the "real" occasion or that the second user equipment 122 performs this adding.

The occasion and possibly the gap once communicated to the second user equipment 122 may be updated, e.g. as a dynamic resending to change the indicated occasion. This may be for example due to that the first user equipment 121 connected to the cellular communications network performs cell reselection to another cell. Another example may be that the first user equipment 121 detects or decides that there is need to perform a resending of the message indicating the upcoming occasion and that communication from the second user equipment 122 to the first user equipment 121 over the D2D radio link 131 shall be prohibited during the occasion, due to assumed possible drifting in synchronization as the cellular communications network 102 and the D2D radio network are not synchronized.

Figure 5:
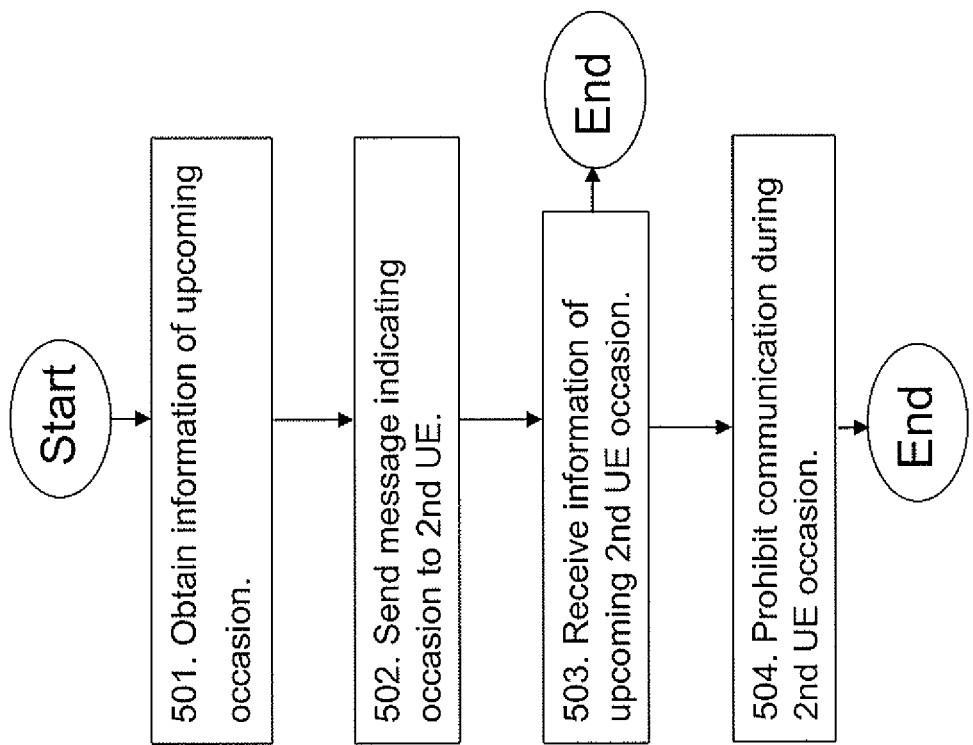
FIG. 5 is a flowchart depicting embodiments of a method in a first user equipment.

Embodiments herein will now be described with reference to the flowchart depicted in FIG. 5. These embodiments relates to a method in the first user equipment 121 for communicating with the second user equipment 122, 300 over the D2D radio link 131, 310 in the D2D radio network 101, 320. As mentioned above, the first user equipment 121 and second user equipment 122, 300 are comprised in the D2D radio network 101, 320. The first user equipment 121 is further comprised in a cellular communications network 102. The method comprises the following actions, which actions are performed by the first user equipment 121. The actions may as well be carried out in another suitable order than described below.

Action 501

The first user equipment 121 obtains information of an upcoming occasion. The occasion is related to a communication in the cellular communications network 102. This action is similar to action 201.

The occasion may comprises any of a paging occasion within the cellular communications network 121, performing a measurement within the cellular communications network 121, acquiring broadcast information from the cellular communications network 121, receiving or sending a data or signalling a transmission within the cellular communications network 121, or receiving Multimedia Broadcast and Multicast Services.

Action 502

The first user equipment 121 sends a message to the second user equipment 122, 300 over the D2D radio link 131, 310. The message indicates the upcoming occasion and that communication from the second user equipment 122,300 to the first user equipment 121 over the D2D radio link 131, 310 shall be prohibited during the occasion. This action is similar to action 202.

In some embodiments the message further indicates that communication to the second user equipment 122, 300 from the first user equipment 121 over the D2D radio link 131, 310 shall be prohibited during the occasion. This may be the case if the second user equipment 122, 300 schedules all D2D communication between the first user equipment 121 and the second user equipment 122, 300, e.g. if the second user equipment 122, 300 is a master device and the first user equipment 121 is a slave device.

In some embodiments the first user equipment 121 uses subframes for communication within the cellular communications network 102. In these embodiments the message may comprise information about which subframes that will be used for the occasion.

In some embodiments the message comprises information required for the second user equipment 122,300 to calculate when the occasion occurs.

In some embodiments the first user equipment 121 does not schedule any D2D communication with the second user equipment 122,300 during the occasion.

In some embodiments the message further comprises an indication of a gap of time. In these embodiments the information indicates that communication between the first user equipment 121 and the second user equipment 122,300 over the D2D radio link 131 further shall be prohibited during the gap of time.

The D2D radio network 101,320 may comprises a Master-Slave architecture. The first user equipment 121 may be a slave device and the second user equipment 122,300 may be a master device, or the first user equipment 121 may be a master device and the second user equipment 122,300 may be a slave device.

Action 503

This action is taken in some embodiments wherein the second user equipment 122, 300 further is comprised in the second cellular communications network 400.

In this action the first user equipment 121 receives a message from the second user equipment 121 over the D2D radio link. The message indicates an upcoming occasion of the second user equipment 122, 300 and that communication from the first user equipment 121 to the second user equipment 122, 300 over the D2D radio link 131, 310 shall be prohibited during the occasion of the second user equipment 122. The occasion is related to communication in the second cellular communications network 400.

Action 504

This action is taken in the embodiments wherein action 503 is taken. In this action the first user equipment 121 prohibits communication from the first user equipment 121 to the second user equipment 122 over the D2D radio link 131,310 during the occasion of the second user equipment 122, according to the received message.

Figure 6:
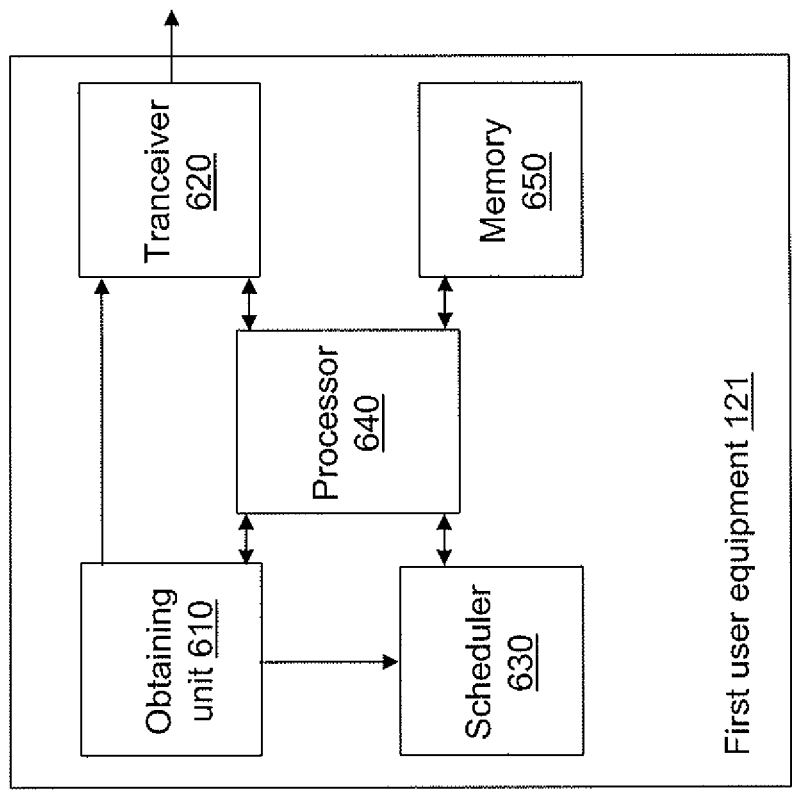
FIG. 6 is a schematic block diagram illustrating embodiments of a first user equipment.

To perform the method steps described above for communicating with the second user equipment 122, 300 over the D2D radio link 131, 310 in a D2D radio network 101,320, the first user equipment 121 comprises the following arrangement depicted in FIG. 6. As mentioned above the first user equipment 121 and second user equipment 122, 300 are configured to be comprised in the D2D radio network 101, 320.

The first user equipment 121 is further configured to be comprised in a cellular communications network 102.

In some embodiments the D2D radio network 101, 320 comprises a Master-Slave architecture. In these embodiments the first user equipment 121 is a Slave device and the second user equipment 122, 300 is a Master device, or the first user equipment 121 is a Master device and the second user equipment 122, 300 is a Slave device.

The first user equipment 121 comprises an obtaining unit 610 configured to obtain information of an upcoming occasion. The occasion is related to a communication in the cellular communications network 102.

In some embodiments the occasion comprises any of: a paging occasion within the cellular communications network 121, performing a measurement within the cellular communications network 121, acquiring broadcast information from the cellular communications network 121, receiving or sending a data or signalling a transmission within the cellular communications network 121, or receiving Multimedia Broadcast and Multicast Services.

The first user equipment 121 further comprises a transceiver 620 configured to send a message to the second user equipment 122, 300 over the D2D radio link 131, 310. The message indicates the upcoming occasion and that communication from the second user equipment 122, 300 to the first user equipment 121 over the D2D radio link 131, 310 shall be prohibited during the occasion.

The message may further indicate that communication to the second user equipment 122, 300 from the first user equipment 121 over the D2D radio link 131, 310 shall be prohibited during the occasion.

In some embodiments, the first user equipment 121 uses subframes for communication within the cellular communications network 102. In these embodiments the message comprises information about which subframes that will be used for the occasion.

In some embodiments the message comprises information required for the second user equipment 122, 300 to calculate when the occasion occurs.

In some embodiments the message further comprises an indication of a gap of time. In these embodiments the information may indicate that communication between the first user equipment 121 and the second user equipment 122, 300 over the D2D radio link 131, 310 further shall be prohibited during the gap of time.

In some embodiments the second user equipment 122 is further comprised in the second cellular communications network 400. In these embodiments the transceiver 620 may further be configured to receive a message from the second user equipment 121 over the D2D radio link 131, 310. This message indicates an upcoming occasion of the second user equipment 122, 300 and that communication from the first user equipment 121 to the second user equipment 122, 300 over the D2D radio link 131, 310 shall be prohibited during the occasion of the second user equipment 122. This occasion is related to communication in the second cellular communications network 400.

The first user equipment 121 may further comprise a scheduler 630 configured to prohibit communication from the first user equipment 121 to the second user equipment 122, 300 over the D2D radio link 131, 320 during the occasion of the second user equipment 122, 300, according to the received message.

The embodiments herein for communicating with the second user equipment 122,300 over the D2D radio link 131, 310 in a D2D radio network 101,320, may be implemented through one or more processors, such as a processor 640 in the first user equipment 121 depicted in FIG. 6, together with computer program code for performing the functions of the embodiments herein. The program code mentioned above may also be provided as a computer program product, for instance in the form of a data carrier carrying computer program code for performing the embodiments herein when being loaded into the first user equipment 121. One such carrier may be in the form of a CD ROM disc. It is however feasible with other data carriers such as a memory stick. The computer program code may furthermore be provided as pure program code on a server and downloaded to the first user equipment 121.

The first user equipment 121 may further comprise a memory 650 comprising one or more memory units. The memory 650 is arranged to be used to store data such as obtained occasions, schedulings, and applications to perform the methods herein when being executed in the first user equipment 121.

Figure 7:
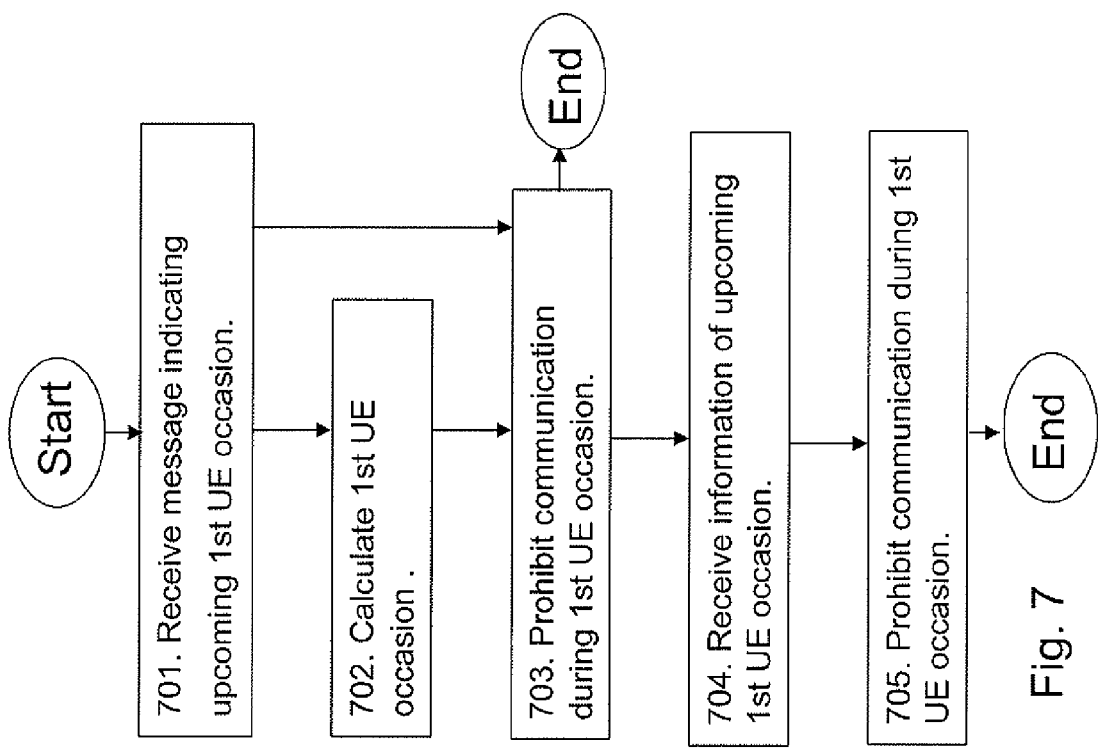
FIG. 7 is a flowchart depicting embodiments of a method in a second user equipment.

Embodiments herein will now be described with reference to the flowchart depicted in FIG. 7. These embodiments relates to a method in the second user equipment 122, 300 for communicating with a first user equipment 121 over a D2D radio link 131, 310 in a D2D radio network 101,320. As mentioned above, first user equipment 121 and second user equipment 122, 300 are comprised in the D2D radio network 101, 320. The first user equipment 121 is further comprised in the cellular communications network 102. In some embodiments the D2D radio network 101, 320 comprises a Master-Slave architecture. In these embodiments the first user equipment 121 is a Slave device and the second user equipment 122, 300 is a Master device, or the first user equipment 121 is a Master device and the second user equipment 122, 300 is a Slave device.

The method comprises the following actions, which actions are performed by the second user equipment 122, 310. The actions may as well be carried out in another suitable order than described below.

Action 701

The second user equipment 122, 300 receives a message from the first user equipment 121 over the D2D radio link 131, 310. The message indicates an upcoming occasion of the first user equipment 121 and that communication from the second user equipment 122,300 to the first user equipment 121 over the D2D radio link 131, 310 shall be prohibited during the occasion. The occasion is related to communication in the cellular communications network 102. This action is similar to action 202.

The message may further indicate that communication to the second user equipment 122,300 from the first user equipment 121 over the D2D radio link shall be prohibited during the occasion.

In some embodiments the message comprises calculation information required for the second user equipment 122,300 to calculate when the occasion occurs.

In some embodiments the first user equipment 121 uses subframes for communication within the cellular communications network 102. In these embodiments the message may comprise information about which subframes that will be used for the occasion.

In some embodiments the message further comprises an indication of a gap of time and wherein the message further indicates that communication from the second user equipment 122,300 to the first user equipment 121 over the D2D radio link 131, 310 shall be prohibited during the gap of time.

Action 702

This action is optional and relates to the embodiments wherein the message comprises calculation information required for the second user equipment 122, 300 to calculate when the occasion occurs. In this action the second user equipment 121 calculates the occasion based on the received calculation information.

Action 703

The second user equipment 122, 300 prohibits communication from the second user equipment 122,300 to the first user equipment 121 over the D2D radio link 131, 310 during the occasion, according to the received message. This action is similar to action 203.

The prohibiting may further comprise prohibiting communication to the second user equipment 122,300 from the first user equipment 121 over the D2D radio link 131, 310 during the occasion.

The prohibiting may further comprise that the second user equipment 122,300 does not schedule any D2D communication with the first user equipment 121 during the occasion.

The prohibiting may further comprise to prohibit that communication from the second user equipment 122, 300 to the first user equipment 121 and/or communication to the second user equipment 122, 300 from the first user equipment 121 over the D2D radio link 131, 310 shall be prohibited during the gap of time.

Action 704

This action relates to some embodiments wherein the second user equipment 122, 300 is further comprised in a second cellular communications network 400. In these embodiments the second user equipment 122, 300 may obtain information of an upcoming occasion, which occasion is related to a communication in second cellular communications network 400.

Action 705

This action relates to some embodiments wherein action 704 is performed. In this action the second user equipment 122, 300 sends a message to the first user equipment 121 over the D2D radio link 131, 310. The message indicates the upcoming occasion of the second user equipment 122, 300 and that communication from the first user equipment 121 to the second user equipment 122, 300 over the D2D radio link 131, 310 shall be prohibited during the occasion.

Figure 8:
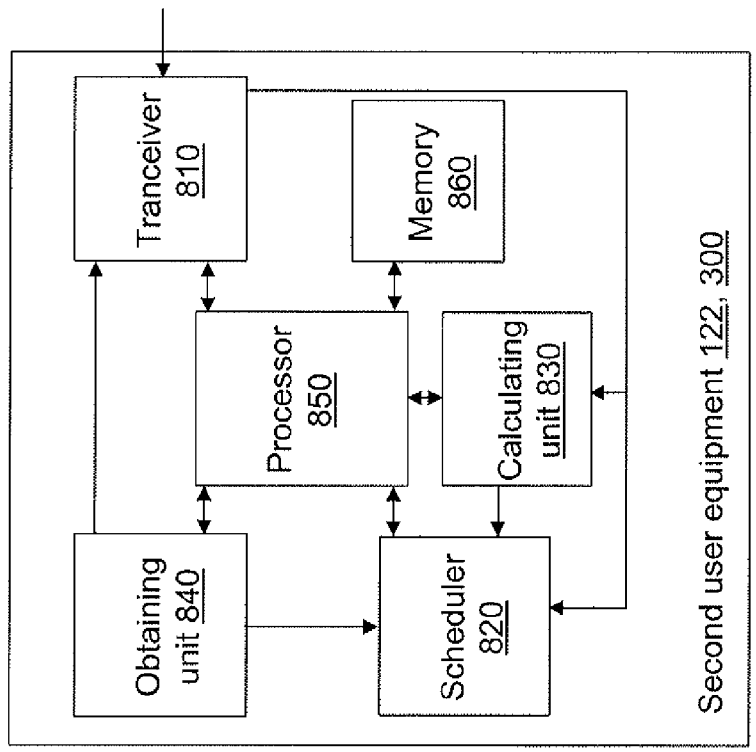
FIG. 8 is a schematic block diagram illustrating embodiments of a second user equipment.

To perform the method steps described above for communicating with the first user equipment 121 over a D2D radio link 131, 310 in the D2D radio network 101,320, the second user equipment 122, 300 comprises the following arrangement depicted in FIG. 8. As mentioned above the first user equipment 121 and the second user equipment 122, 300 are comprised in the D2D radio network 101,320. The first user equipment 121 is further comprised in a cellular communications network 102. In some embodiments the D2D radio network 101,320 comprises a Master-Slave architecture. In these embodiments the first user equipment 121 may be a Slave device and the second user equipment 122, 300 may be a Master device, or the first user equipment 121 may be a Master device and the second user equipment 122, 300 may be a Slave device.

The second user equipment 122, 300 comprises a transceiver 810 configured to receive a message from the first user equipment 121 over the D2D radio link 131, 310. The message indicates an upcoming occasion of the first user equipment 121 and that communication from the second user equipment 122, 300 to the first user equipment 121 over the D2D radio link 131, 310 shall be prohibited during the occasion. The occasion is related to communication in the cellular communications network 102.

The message may further indicate that communication to the second user equipment 122, 300 from the first user equipment 121 over the D2D radio link 131, 310 shall be prohibited during the occasion.

In some embodiments the first user equipment 121 uses subframes for communication within the cellular communications network 102. In these embodiments the message may comprise information about which subframes that will be used for the occasion.

In some embodiments the message comprises calculation information required for the second user equipment 122,300 to calculate when the occasion occurs.

In some embodiments the message further comprises an indication of a gap of time, and wherein the message further indicates that communication from the second user equipment 122,300 to the first user equipment 121 over the D2D radio link 131, 310 shall be prohibited during the gap of time.

The second user equipment 122, 300 further comprises a scheduler 820 configured to prohibit communication from the second user equipment 122, 300 to the first user equipment 121 over the D2D radio link 131, 310 during the occasion, according to the received message.

In some embodiments the scheduler 820 is further configured to prohibit communication to the second user equipment 122, 300 from the first user equipment 121 over the D2D radio link 131, 310 during the occasion.

The scheduler 820 may further be configured to prohibit communication from the second user equipment 122, 300 to the first user equipment 121 and/or communication to the second user equipment 122, 300 from the first user equipment 121 over the D2D radio link 131, 310 during the gap of time.

The second user equipment 122, 300 may further comprise a calculating unit 830 configured to calculate when the occasion occurs based on the received calculation information.

In some embodiments the second user equipment 122 is further comprised in a second cellular communications network 400. In these embodiments the second user equipment 122, 300 may further comprise an obtaining unit 840 configured to obtain information of an upcoming occasion of the second user equipment 122, 140, This occasion is related to a communication in second cellular communications network 400.

In these embodiments the transceiver 810 further is configured to send a message to the first user equipment 121 over the D2D radio link 131, 310. This message indicates the upcoming occasion of the second user equipment 122, 300 and that communication from the first user equipment 121 to the second user equipment 122, 300 over the D2D radio link 131, 310 shall be prohibited during the occasion.

The embodiments herein for communicating with the second user equipment 122, 300 over the D2D radio link 131, 310 in a D2D radio network 101, 320 may be implemented through one or more processors, such as a processor 850 in the second user equipment 122, 300 depicted in FIG. 8, together with computer program code for performing the functions of the embodiments herein. The program code mentioned above may also be provided as a computer program product, for instance in the form of a data carrier carrying computer program code for performing the embodiments herein when being loaded into the second user equipment 122, 300. One such carrier may be in the form of a CD ROM disc. It is however feasible with other data carriers such as a memory stick. The computer program code may furthermore be provided as pure program code on a server and downloaded to the second user equipment 122, 300.

The second user equipment 122, 300 may further comprise a memory 860 comprising one or more memory units. The memory 860 is arranged to be used to store data such as obtained occasions, schedulings, and applications to perform the methods herein when being executed in the second user equipment 122, 300.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first user equipment for communicating with a second user equipment over a Device-to-Device (D2D) radio link in a D2D radio network, which first user equipment and second user equipment are comprised in the D2D radio network, and which first user equipment further is comprised in a cellular communications network, the method comprising:

sending and receiving data directly to and from the second user equipment, over the D2D radio link;

obtaining information of an upcoming occasion, which occasion is related to a communication in the cellular communications network; and sending a message to the second user equipment over the D2D radio link, which message indicates the upcoming occasion and that communication from the second user equipment to the first user equipment over the D2D radio link shall be prohibited during the occasion.

2. The method of claim 1, wherein the message further indicates that communication to the second user equipment from the first user equipment over the D2D radio link shall be prohibited during the occasion.

3. The method of claim 1, wherein the first user equipment uses subframes for communication within the cellular communications network, and wherein the message comprises information about which subframes will be used for the occasion.

4. The method of claim 1, wherein the message comprises information required for the second user equipment to calculate when the occasion occurs.

5. The method of claim 1, further comprising, in the first user equipment, refraining from scheduling any D2D communication with the second user equipment during the occasion.

6. The method of claim 1, wherein the occasion comprises any of: a paging occasion within the cellular communications network; performing a measurement within the cellular communications network; acquiring broadcast information from the cellular communications network; receiving or sending data or signaling a transmission within the cellular communications network; and receiving Multimedia Broadcast and Multicast Services.

7. The method of claim 1, wherein the message further comprises an indication of a gap of time, and wherein the information indicates that communication between the first user equipment and the second user equipment over the D2D radio link further shall be prohibited during the gap of time.

8. The method of claim 1, wherein the D2D radio network comprises a Master-Slave architecture, and wherein the first user equipment is a Slave device and the second user equipment is a Master device, or the first user equipment is a Master device and the second user equipment is a Slave device.

9. The method of claim 1, wherein the second user equipment further is comprised in a second cellular communications network, the method further comprising:

receiving a message from the second user equipment over the D2D radio link, which message indicates an upcoming occasion of the second user equipment and that communication from the first user equipment to the second user equipment over the D2D radio link shall be prohibited during the occasion of the second user equipment, which occasion is related to communication in the second cellular communications network; and prohibiting communication from the first user equipment to the second user equipment over the D2D radio link during the occasion of the second user equipment, according to the received message.

10. A method in a second user equipment for communicating with a first user equipment over a Device-to-Device (D2D) radio link in a D2D radio network, which first user equipment and second user equipment are comprised in the D2D radio network, and which first user equipment further is comprised in a cellular communications network, the method comprising:

sending and receiving data directly to and from the first user equipment, over the D2D radio link;

receiving a message from the first user equipment over the D2D radio link, which message indicates an upcoming occasion of the first user equipment and that communication from the second user equipment to the first user equipment over the D2D radio link shall be prohibited during the occasion, which occasion is related to communication in the cellular communications network.

11. The method of claim 10, further comprising prohibiting communication from the second user equipment to the first user equipment over the D2D radio link during the occasion, according to the received message.

12. The method of claim 10, wherein the message further indicates that communication to the second user equipment from the first user equipment over the D2D radio link shall be prohibited during the occasion, and wherein the prohibiting further comprises prohibiting communication to the second user equipment from the first user equipment over the D2D radio link during the occasion.

13. The method of claim 10, wherein the first user equipment uses subframes for communication within the cellular communications network, and wherein the message comprises information about which subframes will be used for the occasion.

14. The method of claim 10, wherein the message comprises calculation information required for the second user equipment to calculate when the occasion occurs, the method further comprising calculating when the occasion occurs based on the received calculation information.

15. The method of claim 10, wherein the prohibiting comprises that the second user equipment does not schedule any D2D communication with the first user equipment during the occasion.

16. The method of claim 10, wherein the message further comprises an indication of a gap of time, and wherein the message further indicates that communication from the second user equipment to the first user equipment over the D2D radio link shall be prohibited during the gap of time, and wherein the prohibiting further comprises prohibiting that communication from the second user equipment to the first user equipment and/or communication to the second user equipment from the first user equipment over the D2D radio link shall be prohibited during the gap of time.

17. The method of claim 10, wherein the D2D radio network comprises a Master-Slave architecture, and wherein the first user equipment is a Slave device and the second user equipment is a Master device, or the first user equipment is a Master device and the second user equipment is a Slave device.

18. The method of claim 10, wherein the second user equipment further is comprised in a second cellular communications network, the method further comprising:

obtaining information of an upcoming occasion of the second user equipment, which occasion is related to a communication in the second cellular communications network; and sending a message to the first user equipment over the D2D radio link, which message indicates the upcoming occasion of the second user equipment and that communication from the first user equipment to the second user equipment over the D2D radio link shall be prohibited during the occasion of the second user equipment.

19. A first user equipment for communicating with a second user equipment over a Device-to-Device (D2D) radio link in a D2D radio network, which first user equipment and second user equipment are configured to be comprised in the D2D radio network, and which first user equipment further is configured to be comprised in a cellular communications network, the first user equipment comprising:

an obtaining unit configured to obtain information of an upcoming occasion, which occasion is related to a communication in the cellular communications network; and a transceiver configured to send and receive data directly to and from the second user equipment, over the D2D link, and to send a message to the second user equipment over the D2D radio link, which message indicates the upcoming occasion and that communication from the second user equipment to the first user equipment over the D2D radio link shall be prohibited during the occasion.

20. A first user equipment according to claim 19, wherein the message further indicates that communication to the second user equipment from the first user equipment over the D2D radio link shall be prohibited during the occasion.

21. A first user equipment according to claim 19, wherein the first user equipment uses subframes for communication within the cellular communications network, and wherein the message comprises information about which subframes will be used for the occasion.

22. A first user equipment according to claim 19, wherein the message comprises information required for the second user equipment to calculate when the occasion occurs.

23. A first user equipment according to claim 19, wherein the occasion comprises any of: a paging occasion within the cellular communications network; performing a measurement within the cellular communications network; acquiring broadcast information from the cellular communications network; receiving or sending data or signaling a transmission within the cellular communications network; and receiving Multimedia Broadcast and Multicast Services.

24. A first user equipment according to claim 19, wherein the message further comprises an indication of a gap of time, and wherein the information indicates that communication between the first user equipment and the second user equipment over the D2D radio link further shall be prohibited during the gap of time.

25. A first user equipment according to claim 19, wherein the D2D radio network comprises a Master-Slave architecture, and wherein the first user equipment is a Slave device and the second user equipment is a Master device, or the first user equipment is a Master device and the second user equipment is a Slave device.

26. A first user equipment according to claim 19, wherein the second user equipment further is comprised in a second cellular communications network, and wherein the transceiver further is configured to receive a message from the second user equipment over the D2D radio link, which message indicates an upcoming occasion of the second user equipment and that communication from the first user equipment to the second user equipment over the D2D radio link shall be prohibited during the occasion of the second user equipment, which occasion is related to communication in the second cellular communications network, and wherein the first user equipment comprises a scheduler configured to prohibit communication from the first user equipment to the second user equipment over the D2D radio link during the occasion of the second user equipment, according to the received message.

27. A second user equipment for communicating with a first user equipment over a Device-to-Device (D2D) radio link in a D2D radio network, which first user equipment and second user equipment are comprised in the D2D radio network, and which first user equipment further is comprised in a cellular communications network, the second user equipment comprising:

a transceiver configured to send and receive data directly to and from the second user equipment, over the D2D link, and to receive a message from the first user equipment over the D2D radio link, which message indicates an upcoming occasion of the first user equipment and that communication from the second user equipment to the first user equipment over the D2D radio link shall be prohibited during the occasion, which occasion is related to communication in the cellular communications network.

28. A second user equipment according to claim 27, further comprising a scheduler configured to prohibit communication from the second user equipment to the first user equipment over the D2D radio link during the occasion, according to the received message.

29. A second user equipment according to claim 27, wherein the message further indicates that communication to the second user equipment from the first user equipment over the D2D radio link shall be prohibited during the occasion, and wherein the scheduler further is configured to prohibit communication to the second user equipment from the first user equipment over the D2D radio link during the occasion.

30. A second user equipment according to claim 27, wherein the first user equipment uses subframes for communication within the cellular communications network, and wherein the message comprises information about which subframes that will be used for the occasion.

31. A second user equipment according to claim 27, wherein the message comprises calculation information required for the second user equipment to calculate when the occasion occurs, the second user equipment further comprising a calculating unit configured to calculate when the occasion occurs based on the received calculation information.

32. A second user equipment according to claim 27, wherein the message further comprises an indication of a gap of time, and wherein the message further indicates that communication from the second user equipment to the first user equipment over the D2D radio link shall be prohibited during the gap of time, and wherein the scheduler further is configured to prohibit communication from the second user equipment to the first user equipment and/or communication to the second user equipment from the first user equipment over the D2D radio link during the gap of time.

33. A second user equipment according to claim 27, wherein the D2D radio network comprises a Master-Slave architecture, and wherein the first user equipment is a Slave device and the second user equipment is a Master device, or the first user equipment is a Master device and the second user equipment is a Slave device.

34. A second user equipment according to claim 27, wherein the second user equipment further is comprised in a second cellular communications network, the second user equipment further comprising:

an obtaining unit configured to obtain information of an upcoming occasion of the second user equipment, which occasion is related to a communication in second cellular communications network, and wherein the transceiver further is configured to send a message to the first user equipment over the D2D radio link, which message indicates the upcoming occasion of the second user equipment and that communication from the first user equipment to the second user equipment over the D2D radio link shall be prohibited during the occasion of the second user equipment.

* * * * *